US006623646B2

(12) United States Patent
Bryant et al.

(10) Patent No.: US 6,623,646 B2
(45) Date of Patent: Sep. 23, 2003

(54) IN-SITU CHEMICAL OXIDATION-REDUCTION AND PRECIPITATION OF HEAVY METALS IN SOILS AND GROUNDWATER

(75) Inventors: James Daniel Bryant, 21 Crater Lake Rd., Howell, NJ (US) 07731; James Thomas Wilson, Brielle, NJ (US)

(73) Assignee: James Daniel Bryant, Howell, NJ (US)

( * ) Notice: Subject to any disclaimer, the term of this patent is extended or adjusted under 35 U.S.C. 154(b) by 0 days.

(21) Appl. No.: 09/855,442

(22) Filed: May 15, 2001

(65) Prior Publication Data
US 2001/0042722 A1 Nov. 22, 2001

Related U.S. Application Data
(60) Provisional application No. 60/205,326, filed on May 16, 2000.

(51) Int. Cl.[7] .................................................. C02F 1/62
(52) U.S. Cl. .................. 210/717; 166/250.01; 210/719; 210/720; 210/721; 210/724; 210/739; 210/757; 210/759; 210/904; 210/912; 210/913; 210/747; 405/128.5; 405/263; 588/246; 588/256
(58) Field of Search .......................... 166/245, 52, 270, 166/370, 250.01; 210/717, 719, 720, 721, 724, 722, 739, 743, 747, 757, 759, 904, 912, 913; 405/128.5, 263; 588/246, 256

(56) References Cited

U.S. PATENT DOCUMENTS

| | | | |
|---|---|---|---|
| 3,896,209 A | 7/1975 | Fournier et al. ............... 423/55 |
| 3,901,805 A | 8/1975 | Stewart ........................ 210/50 |
| 4,321,149 A | 3/1982 | Hawxhurst et al. .......... 210/720 |
| 4,724,084 A | 2/1988 | Pahmeier et al. ............ 210/709 |
| 4,749,491 A | 6/1988 | Lawes et al. ................. 210/610 |
| 4,770,773 A | 9/1988 | Pahmeier et al. ............ 210/199 |
| 4,966,715 A | * 10/1990 | Ahsan et al. ................ 210/721 |
| 5,158,686 A | 10/1992 | Kigel .......................... 210/713 |
| 5,285,000 A | 2/1994 | Schwitzgebel ............... 588/256 |
| 5,286,141 A | 2/1994 | Vigneri ........................ 405/128 |
| 5,304,710 A | 4/1994 | Kigel et al. .................. 588/257 |
| 5,308,501 A | 5/1994 | Eckert ......................... 210/718 |
| 5,316,684 A | 5/1994 | Morico ........................ 210/757 |
| 5,397,478 A | 3/1995 | Pal et al. ..................... 210/710 |
| 5,520,483 A | 5/1996 | Vigneri ........................ 405/128 |
| 5,525,008 A | 6/1996 | Wilson ........................ 405/128 |
| 5,545,331 A | 8/1996 | Guess ......................... 210/713 |
| 5,562,588 A | 10/1996 | Higgins ....................... 588/256 |
| 5,611,642 A | 3/1997 | Wilson ........................ 405/128 |
| 5,837,145 A | * 11/1998 | Dzombak et al. ............ 166/310 |
| 5,951,457 A | * 9/1999 | James ......................... 210/747 |
| 5,967,230 A | * 10/1999 | Cooper et al. ............... 166/245 |

OTHER PUBLICATIONS

Jesse Tremaine and Nora L. eel; *In Situ Remediation of Hexavalent Chromium in Groundwater: Practical Implementation*, 101–102.

William J. Walker and Lara E. Pucik–Ericksen; *In Situ Reduction of Hexavalent Chromium in Groundwater and Surface Soil Using Acidified Ferrous Sulfate*, p. 99–100.

* cited by examiner

Primary Examiner—Peter A. Hruskoci
(74) Attorney, Agent, or Firm—Robert I. Pearlman; Riker, Danzig, Scherer, Hyland & Perretti LLP

(57) ABSTRACT

A method is taught for converting metal contaminants in the soil to less toxic forms as well as permitting their removal from groundwater. A first reactive solution comprising ferrous sulfate and an acid selected from the group consisting of sulfuric acid and phosphoric acid is injected to decomplex contaminants and precipitate them as insoluble compounds. A second reactive solution comprising hydrogen peroxide, and an acid selected from the group consisting of sulfuric acid and phosphoric acid is then injected to destroy organic liquids and enhance decomplexation. The pH of the first solution may range from 3 to 5, and the pH of the second solution range from 3 to 7, preferably 5 to 7. The process is particularly effective where chromium compounds such as hexavalent chromium are the contaminants.

18 Claims, 4 Drawing Sheets

IN-SITU CHEMICAL OXIDATION-REDUCTION AND PRECIPITATION OF HEAVY METALS IN SOILS AND GROUNDWATER

This application claims the benefit of U.S. Provisional Application No. 60/205,326 filed May 16, 2000.

BACKGROUND OF THE INVENTION

1. Field of the Invention

This invention relates generally to the field of in-situ soil and groundwater remediation, more particularly to a method for remediation of soil and groundwater which has become contaminated with heavy metals, semi-metals, and cyanide, and most particularly to the remediation of soils and groundwater contaminated with hexavalent chromium.

2. Description of the Prior Art

Subterranean contamination of soil and groundwater resulting from leaking storage facilities or accidental or even purposeful discharge has become a problem in almost all industrialized areas of the planet. Industrialized society had historically stored, discharged and disposed of various hazardous substances and waste products to the soil and groundwater. However, in recent decades, society has recognized that discharged substances contaminate the soil and groundwater and can thereby cause severe health hazards and damage to the local environment. Discharged substances have consisted of both organic and inorganic materials. The inorganic toxic discharges have included chromium, hexavalent chromium and other heavy metals, and semi-metals including substances such as cadmium, lead, copper, nickel, arsenic and cyanides.

The growing concern for the protection of the environment has led federal, state and local governments to enact a series of laws and regulations placing strict standards on the permissible percentages of toxic substances in waste waters, solids and solid wastes. As a consequence of past discharges and subsequent contamination, individuals, companies and governments have been forced to expend a great deal of time and financial resources in remediation. The present invention is an improved and efficient method for chemical remediation of heavy metals, semi-metals and cyanide in contaminated sites, and more particularly, a method for the remediation of hexavalent chromium.

The related prior art may be broadly categorized as falling into three groups:

Methods to prevent contamination by removing contaminants from liquid waste effluents.

U.S. Pat. Nos. 3,896,209, 3,901,805, 4,321,149, 4,724,084, 4,770,773, 4,996,715, 5,308,501, 5,316,684 and 5,545,331 describe methods, reagents and apparatus for removing heavy metals and/or cyanides from liquid effluents.

Methods to decontaminate soils necessitating excavation of the contaminated sites.

U.S. Pat. Nos. 5,158,686, and 5,304,710 describe methods, reagents and apparatus for this purpose. Such methods are very costly compared to the method of the invention.

Methods for in-situ remediation of toxic wastes in soils and groundwater.

U.S. Pat. Nos. 4,749,491, 5,285,000, 5,286,141, 5,397,478, 5,520,483, 5,525,008, 5,562,588 and 5,611,642 are most relevant to the present invention.

Of the in-situ remediation methods, U.S. Pat. Nos. 4,749,491, 4,749,491, 5,285,000, 5,286,141, 5,520,483 are directed toward remediation of organic contaminants such as hydrocarbons and halogenated hydrocarbons. These disclosures have a different objective and describe methods differing from the method of the present invention.

Closer to the present invention are U.S. Pat. No. 5,525,008 and U.S. Pat. No. 5,611,642, both of which are expressly incorporated herein by reference. U.S. Pat. No. 5,525,008 discloses a general remediation method. U.S. Pat. No. 5,611,642 discloses specially designed injector wells appropriate for use in the present invention.

The remaining prior art patents deal with in-situ methods for remediation of heavy metals including hexavalent chromium but describe different methods and different reagents than the present invention. U.S. Pat. No. 5,397,478 and U.S. Pat. No. 5,562,588 are in-situ methods only in a limited sense. U.S. Pat. No. 5,397,478 describes a chemical method for in-situ treatment requiring mechanical mixing, e.g. rototilling of the soil with reagents. This method is feasible and cost effective only in the case where the contamination lies very close to the surface. Similarly, U.S. Pat. No. 5,562,588 describes a bioremediation method requiring mixing of the soil with bacteria and nutrients. It has the same disadvantages as U.S. Pat. No. 5,397,478 and/or methods requiring excavation of the site.

U.S. Pat. No. 5,285,000 describes a two-solution injection method. First a reducing agent is injected into the soil, followed by a drying step and then injection of a gelling agent. In this method, the soil volume treated becomes impermeable to liquid flow shortly after injection of the gelling solution. Consequently, injection wells must be very closely spaced to achieve uniform saturation of the entire soil volume before permeability declines. This can be quite costly and completeness and uniformity of treatment cannot be assured. Normal flow of groundwater and surface water in and near the treated site is also disrupted.

A need exists for an in-situ method for chromium and other heavy metal remediation that is economical, thorough, uniform and verifiable. Claim 1 of U.S. Pat. No. 5,525,008 describes a method for the in-situ remediation of a contaminated underground area. This invention is an improvement of that method directed to remediation of chromium and other heavy metals, semi-metal and cyanide contamination.

SUMMARY OF THE INVENTION

The invention is an in-situ technology for removing metals from groundwater and permanently immobilizing the metals in an unsoluble form in the soil. The method comprises the steps of determining an effective amount and concentration of a first reactive solution comprising ferrous sulfate and an acid selected from the group consisting of sulfuric acid and phosphoric acid required to decomplex chromium and other heavy metals, semi-metals and cyanide from mineral surfaces. For most heavy metals, the oxidized state is the least soluble. However for chromium the valence state must be reduced whereas for most other heavy metals such as cadmium or arsenic the valence state must be increased. When hexavalent chromium is the contaminant, the addition of the first solution reduces it to the trivalent chromium which is thereby precipitated. Much less ferrous sulfate is preferred to treat other heavy metals.

An effective amount and concentration of a second reactive solution comprising hydrogen peroxide and an acid selected from the group consisting of sulphuric acid and phosphoric acid required to destroy organic ligands and enhance decomplexation; injecting the first reactive solution and subsequently the second reactive solution at an effective pressure and at a flow rate in excess of a sustainable yield of the amount of said first reactive solution and second reactive solution into one or more injectors that are inserted into the ground, sealed and positioned so as to assure liquid flow and dispersion of the reactive solutions through the contaminated area; and allowing said first and second reactive solutions to flow through the contaminated area, thereby reacting chemically with the contaminants contained therein. Preferably, the injection of the second reactive solution is pulsed.

When treating non-chromium contaminants, the iron concentration in the first treating solution may be reduced to 50 to 1000 mg/L and the peroxide concentration in the second solution increased to 1–25%.

It is preferred that the pH of the first reactive solution is in a range from about 3 to about 5 and the pH of the second reactive solution is in a range from about 3 to about 7. Most preferably the pH of the first reactive solution is in a range from about 3.5 to 4.5 and the pH of the second reactive solution is 5 to 7 when treating chromium. Normally the pH of solution 2 will range from 3 to 7. However if the solution is used to treat groundwater at a pH of 5 to 7, the treating solution can be at 5 to 7.

Advantageously, the present invention converts metal and semi-metal contaminants such as hexavalent chromium, cadmium, lead, copper, nickel and arsenic, as well as cyanides into environmentally inert substances without producing any collateral contamination. The inventive method effectively treats both soil and groundwater, regardless of whether the source of contamination is situated above or below ground level. Further, the invention does not disrupt the long-term normal flow of groundwater or surface water in or near the contaminated site and is applicable for both short and long-term treatment of a contaminated site.

DESCRIPTION OF THE DRAWINGS

The teachings of the present invention can be readily understood by considering the following detailed description in conjunction with the accompanying drawings, in which:

FIG. 2A shows the dependence of the second order rate coefficient for the reaction between $Fe^{+2}$ and $Cr^{+6}$ upon pH (conditions: temperature=25° C., initial $[Fe^{+2}]$=0.09 μM, initial $[Cr^{+6}]$=0.3 μM.

FIG. 2B shows the dependence of the estimated half-life of $Cr^{+6}$ upon pH. It shows the estimated half-life of $Cr^{+6}$ in groundwater as a function of pH in the presence of excess $Fe^{+2}$ reductant (conditions: temperature=5° C., initial $[Fe^{+2}]$=10 MM).

FIG. 2C shows the dependence of the second order rate coefficient upon temperature at a range of pH.

FIG. 3A shows the adsorption of $Cr^{+3}$ by kaolinite from aqueous solution (a common clay mineral in soils) as a function of pH. The data are from R. A. Griffin et als, *J. Environ. Sci. Health.* A12, 431–449 (1977). Two aqueous solutions were analyzed, a $Cr(NO_3)_3$ reagent and a landfill leachate from Illinois. Adsorption of $Cr^{+3}$ is complete at pH>6.

FIG. 3B shows the suppression of $Cr^{+6}$ absorption on iron oxide by the presence of sulfate ion. Data are from F. C. Richard and A. C. M. Bourg, *Wat. Res.* 25, 807–816 (1991). It shows sulfate ($SO_4^{-2}$) suppression of $Cr^{+6}$ absorption (as chromate, $CrO_4^{-2}$) on iron oxide (a common aquifer mineral component). Adsorption is reduced by 30–40% in the presence of a competitive anion such as sulfate. The presence of additional competitive anions produces greater suppression (conditions: $[SO_4^{-2}]$=2.5 mM; $[CrO_4^{-2}]$=μM).

FIG. 3C shows the adsorption and desorption of $Cr^{+6}$ by alluvial aquifer material as a function of flush volume. Data are from K. G. Stollenwerk and D. B. Grove, *J. Environ. Qual.*, 14, 150–155 (1985). The aquifer material has an initially high affinity for $Cr^{+6}$ adsorption from ground water flushed through the soil column (from 0 to 20 pore volumes), but adsorbance decreases rapidly after flushing 10–20 pore volumes. $Cr^{+6}$ returns to solution readily after flushing with groundwater free of $Cr^{+6}$ (conditions: $[Cr^{+6}]$=960 μM; flush rate =7x10$^{-4}$ cm/sec, pH=6.8; porosity =40%; one pore volume =606 mL).

DETAILED DESCRIPTION OF THE INVENTION

The technology employed in this invention converts chromium and other heavy metals, and semi-metals from soluble to insoluble mineral forms, thus achieving permanent and irreversible removal from soil and groundwater. Cyanides are oxidized to non-toxic materials. For brevity, the method of the invention will be illustrated by specific discussion of hexavalent chromium remediation. However, it will be evident to those skilled in the art that while the invention is shown and described in detail in the context of a preferred embodiment, the method is applicable to the other contaminant materials noted and a wide variety of modifications can be made without departing from the scope of the inventive teachings.

The technology described here exploits the different solubility characteristics of $Cr^{+6}$ and $Cr^{+3}$. The process of the invention reduces $Cr^{+6}$ to $Cr^{+3}$ and precipitates $Cr^{+3}$ in an insoluble mineral form. The described technology couples Fe—Cr redox chemistry with enhancements to improve organic complex destruction and desorption in the subsurface, and the proven subsurface injection technology of the heretofore referenced U.S. Pat. No. 5,525,008 and U.S. Pat. No. 5,611,642.

The environmental chemistry of chromium has been reviewed in a number of comprehensive sources including: F. C. Richard and A. C. Bourg, *Wat.Res.*, 25, 807816, (1991); J. E. McLean and B. E. Bledsoe, U.S. Environmental Protection Agency, Ground Water Issue (EPA/540/S-92/018). 1992; C. D. Palmer and R. W. Puls, U.S. Environmental Protection Agency, Ground Water Issue (EPA/540/5-94/505), 1994; U.S. Environmental Protection Agency, (EPA-540-R-95-512), 1995 and S. E. Fendorf, *Geoderma*, 67, 55–71 (1995), which cumulatively form the principal basis for the following discussion.

Chromium dissolved in natural waters exists primarily in two valence states, $Cr^{+6}$ (hexavalent) and $Cr^{+3}$ (trivalent). In groundwater $Cr^{+6}$ exists as anionic species, predominantly chromate ($CrO_4^{-2}$) and bichromate ($HCrO_4^-$). The relative fraction of these species is primarily a function of pH. Above pH of about 6.5, $CrO_4^{-2}$ dominates. $HCrO_4^-$ is predominant under mildly acidic groundwater conditions (pH below about 6.5). An additional anionic $Cr^{+6}$ species, $Cr_2O_7^{-2}$ (dichromate), becomes significant only at relatively high $Cr^{+6}$ concentrations (greater than~50 mg/L) and under acidic pH conditions. Due to its anionic character $Cr^{+6}$ is not readily adsorbed by mineral surfaces which are dominated by negative surface charges, and the fraction that is adsorbed is readily displaced by competing anions such as sulfate. As a result, $Cr^{+6}$ is generally considered "highly mobile" in soils.

Figure 1:
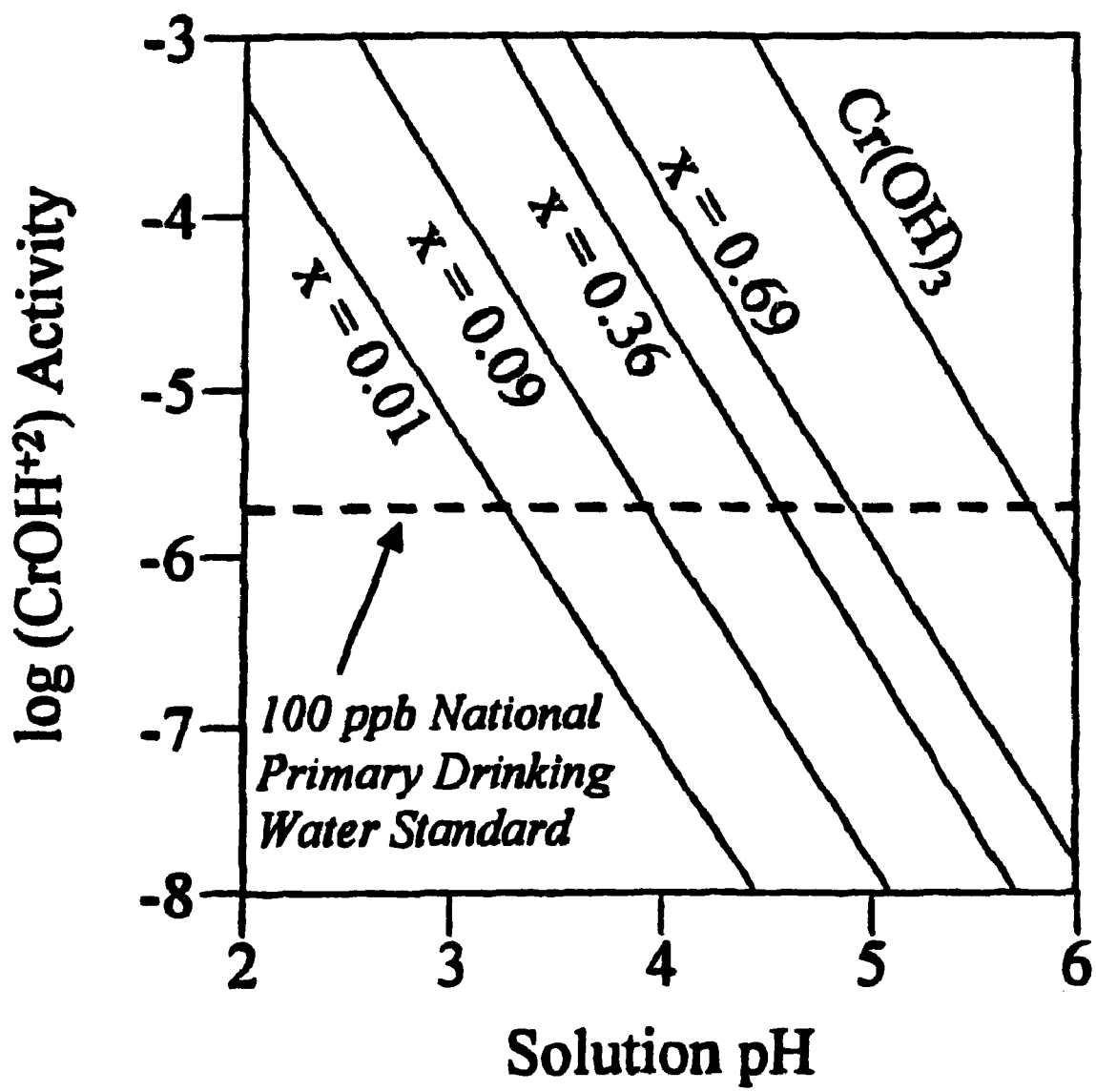
FIG. 1 is a plot of dissolved $Cr^{+3}$ in equilibrium with iron-chromium hydroxides as a function of solution pH. The data are from B. M. Sass and D. Rai, *Inorg. Chem.*, 26, 2228–2232 (1987).

In contrast, $Cr^{+3}$ exists as cationic species, predominantly $Cr(OH)^{+2}$ and $Cr(OH)_2^+$, which are very reactive and readily coprecipitated with insoluble iron oxides or hydroxides, or precipitated as insoluble $Cr(OH)_3$. As a result of the cationic nature and reactivity, $Cr^{+3}$ is much less soluble than $Cr^{+6}$ in the pH range from 5 to 12. As may be seen from FIG. 1, dissolved $Cr^{+3}$ in equilibrium with all iron-chromium hydroxides is below the National Primary Drinking Water Standard of 100 ppb at pH levels greater than 5.8. In FIG. 1, the compositional ranges are in the form of $Cr_xFe_{1-x}(OH)_3$, hence x=0.00 is $Fe(OH)_3$, and x=1.00 is $Cr(OH)_3$. $Cr^{+6}$ is of primary concern in groundwater due to its high solubility and toxicity. However, both $Cr^{+6}$ and $Cr^{+3}$ interact with natural organic and inorganic aquifer components, which affect the valence, solubility, and reactivity of chromium in groundwater.

Natural and anthropogenic organic matter may reduce $Cr^{+6}$ to $Cr^{+3}$ but more important, can form soluble complexes with either valence state. Fulvic and humic acids, which are natural organic compounds constituting as much as 75% of soil organic matter, can reduce $Cr^{+6}$ to $Cr^{+3}$ but only under acidic conditions not encountered in most aquifers. Volatile organic contaminants often found associated with chromium wastes, including alkanes, aliphatic and aromatic acids, and ketones, are also efficient $Cr^{+6}$ reductants. Organic compounds also catalyze $Cr^{+6}$ reduction at mineral surfaces by enhancing adsorption. Many organic compounds, however, chelate chromium and maintain it in soluble forms even after reduction to $Cr^{+3}$. Soluble, organically bound $Cr^{+3}$ may subsequently oxidize to $Cr^{+6}$ in the presence of natural oxidants in groundwater, rather than precipitate as insoluble mineral forms. Thus, although natural organic compounds may initially reduce $Cr+^6$, organically bound chromium may provide a persistent dissolved chromium source to groundwater. Advantageously, the method described herein decomplexes chromium from organic ligands and allows chemical reduction and irreversible precipitation of chromium from groundwater.

Inorganic compounds affect chromium oxidation-reduction (redox) chemistry and solubility via several pathways. Reduction of $Cr^{+6}$ by transition metals in aqueous solution is rapid and complete. Ferrous iron is an efficient reductant of $Cr^{+6}$, is relatively abundant in mineral and dissolved forms in natural aquifers, and is an important component of the process described here. The reaction occurs via three, one-electron transfer steps between $Fe^{+2}$ and chromium:

$Fe^{+2}+Cr^{+6}\rightarrow Fe^{+3}+Cr^{+5}$
$Fe^{+2}+Cr^{+5}\rightarrow Fe^{+3}+Cr^{+4}$
$Fe^{+2}+Cr^{+4}\rightarrow Fe^{+3}+Cr^{+3}$
net reaction: $3Fe^{+2}+Cr^{+6}\rightarrow Fe^{+3}+Cr^{+3}$ Thus the stoichiometric relationship is 3 moles of $Fe^{+2}$ required to completely reduce 1 mole of $Cr^{+6}$. The reduction follows first order kinetics with respect to $Fe^{+2}$ and $Cr^{+6}$ concentrations individually and is second order overall. The ionic species involved and reaction rates vary with solution pH. In the pH range of 5 to 7, the predominant naturally occurring species are ionic $Fe^{+2}$ and bichromate ($HCrO_4^-$), and the product is an iron-chromium hydroxide. The corresponding net redox and precipitation reaction is:

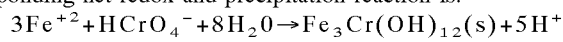

Figure 2A:
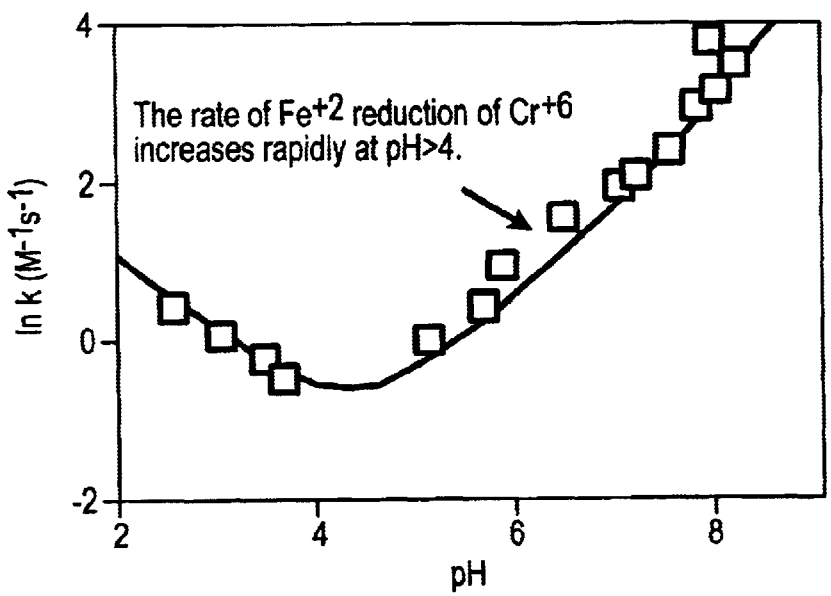
FIGS. 2A, 2B and 2C show the kinetics of $Cr^{+6}$ reduction by $Fe^{+2}$. All data are from D. L. Sedlak and P. G. Chan, *Geochim. Cosmochim. Acta*, 61, 2185–2192 (1997).
Figure 2B:
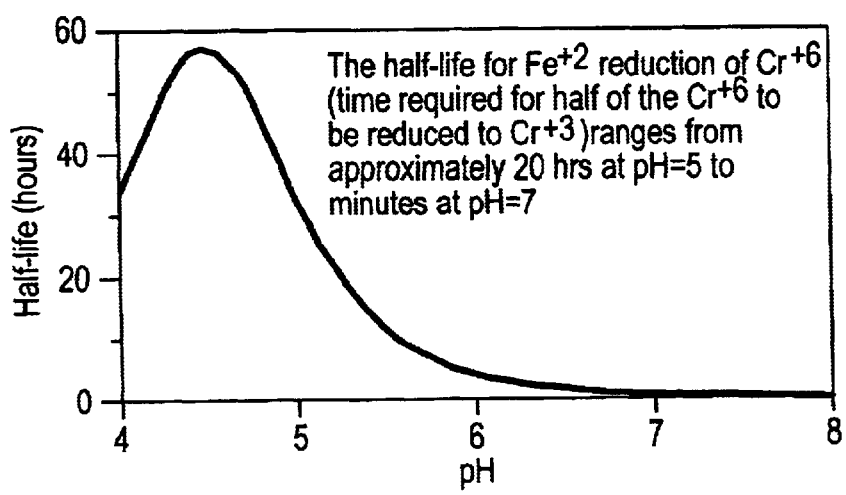
Figure 2C:
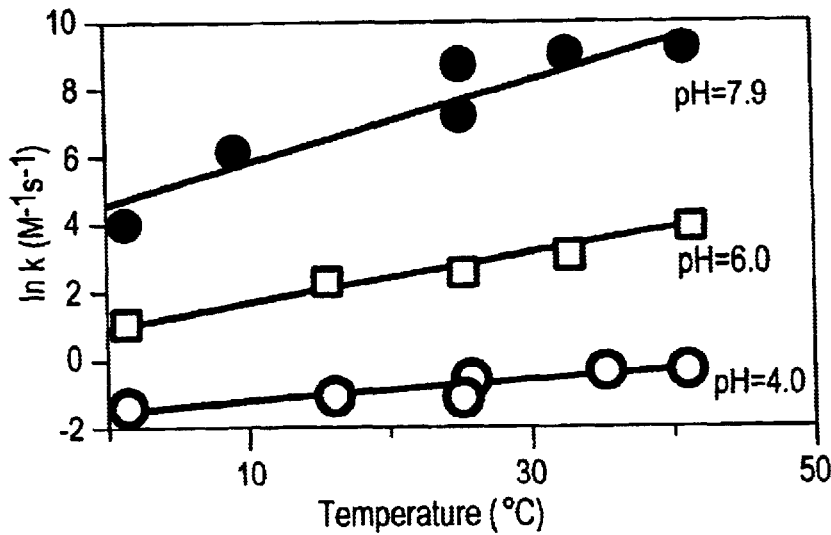

More precisely, the precipitated species may be represented as $Cr_xFe_{1-x}(OH)_3$ to include any member of a solid solution between $Fe(OH)_3$ and $Cr(OH)_3$. The minimum reaction rate occurs at pH about 4 and increases rapidly with pH (FIG. 2A). The corresponding calculated half-life of $Cr^{+6}$ as a function of pH ranges from hours to minutes (FIG. 2B). There is also a slight temperature effect (FIG. 2C), with more rapid reaction occurring at higher temperatures.

Formation of an insoluble brown precipitate after $Fe^{+2}$ reduction of $Cr^{+6}$ is widely described in the literature. The precipitate is generally identified as an amorphous $Fe^{+3}$—$Cr^{+3}$ hydroxide. Analysis of Fe—Cr precipitates resulting from $Fe^{+2}$ reduction of $Cr^{+6}$, using X-ray diffraction, Mossbauer, X-ray photoelectron, and Raman spectroscopies, has found that the chromium is structurally incorporated in the precipitate and is present only as $Cr^{+3}$. Iron and chromium hydroxides in the solid solution between $Fe(OH)_3$ and $Cr(OH)_3$ are insoluble under typical groundwater and aquifer conditions. Solubility varies with pH, temperature and molar ratio of Cr to Fe in the solid. Between pH values of 6 and 8 (typical for natural aquifers), total Cr concentration in aqueous solutions in equilibrium with solid $Cr_xFe_{1-x}(OH)_3$ is well below the USEPA Primary Drinking Water Standard of 100 $\mu$g/L (FIG. 1).

Figure 3A:
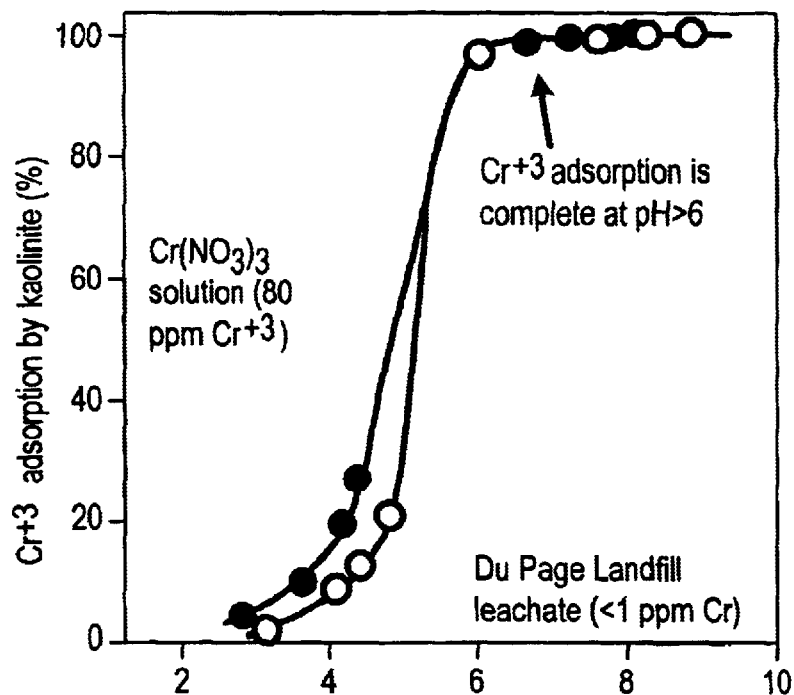
FIGS. 3A, 3B and 3C show the adsorption and desorption of $Cr^{+6}$ and $Cr^{+3}$ by aquifer materials.

Both $Cr^{+6}$ and $Cr^{+3}$ species are adsorbed to mineral surfaces. $Cr^{+3}$ (existing as cationic species $Cr(OH)^{+2}$ and $Cr(OH)_2^+$) is adsorbed to negatively-charged soil colloids and to clay minerals and iron oxides via formation of hydroxyl polymers on mineral surfaces followed by precipitation of chromium oxides or coprecipitation with iron oxides. Sorption and precipitation are pH dependent, but within the range of 5 to 7 adsorption and precipitation are rapid and complete (FIG. 3A). Precipitation of $Cr^{+3}$ as insoluble chromium oxides or coprecipitation with insoluble iron oxides provides essentially permanent $Cr^{+3}$ removal from groundwater, because these minerals are not soluble within the broad range of pH and Eh conditions encountered in natural aquifers. Eh denotes the oxidation—reduction potential. It refers to the availability of electrons for transfer in oxidation—reduction reactions, such as the reduction of hexavalent chromium.

Figure 3B:
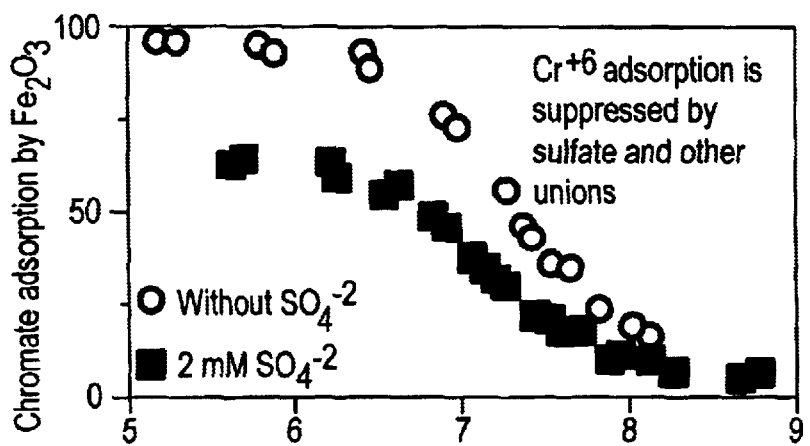
Figure 3C:
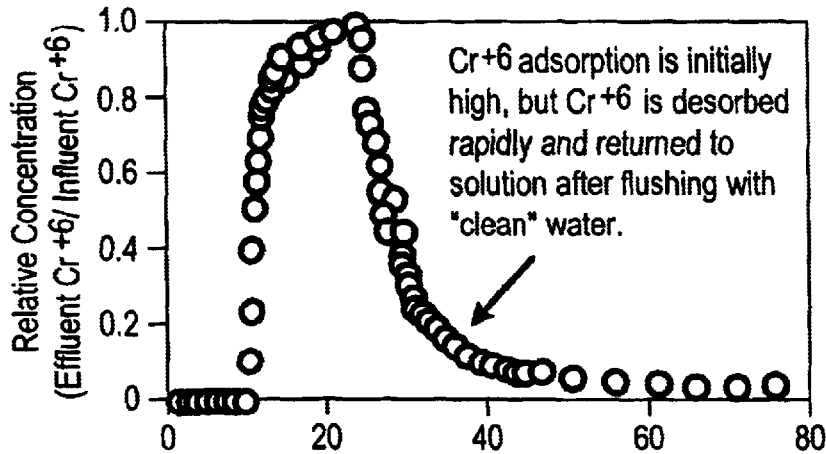

$Cr^{+6}$ (existing as anionic species $CrO_4^{-2}$ and $HCrO_4$) is adsorbed by forming inner-sphere complexes with oxygen on iron oxides and on hydroxylated surface charges and defects in clay minerals. Once adsorbed to the surface of an iron-bearing mineral, $Cr^{+6}$ may be reduced to $Cr^{+3}$ and precipitated as chromium oxide or coprecipitated with iron oxides. $Cr^{+6}$ sorption is enhanced under acidic pH conditions and in the absence of anions that compete for surface complexation sites. Adsorption of $Cr^{+6}$ is strongly suppressed in the presence of sulfate ($SO_4^{-2}$) or phosphate ($SO_4^{-3}$) (FIG. 3B). In contrast to $Cr^{+3}$, however, $Cr^{+6}$ sorption is reversible if reduction and precipitation do not occur. For example, it has been found that soil from a natural alluvial aquifer initially had a high affinity for $Cr^{+6}$ when flushed with groundwater spiked with chromate. However, $Cr^{+6}$ was rapidly desorbed and returned to solution when the soil was flushed with groundwater containing no chromate (FIG. 3C).

Most chromate salts are very soluble and chromate-bearing minerals are rare in nature. Two chromate-bearing mineral phases existing either as small crystalline precipitates or crusts on other minerals or soil particles have been identified at a former plating facility with very acidic groundwater (pH about 2.3 to 4) and extremely high $Cr^{+6}$ concentrations (up to 19,000 mg/L [1.9%] in groundwater and 60,000 mg/kg [6%] in soil). Solubility experiments on a chromate mineral identified as $KFe_3(CrO_4)_2(OH)_6$ (the predominant chromate mineral detected at this site) indicate that the mineral phase is stable only under acidic conditions (pH less than 6) and very high dissolved chromium concentrations (greater than 100,000 $\mu g/L$).

Oxidation of $Cr^{+3}$ to $Cr^{+6}$ can occur under acidic conditions by manganese (Mn) minerals. The oxidative mechanism is a three-step solid-state process in which: $Cr^{+3}$ is sorbed to $Mn^{+4}$ and $Mn^{+3}$ vacancies in manganese oxide minerals, $Cr^{+3}$ oxidation is coupled with $Mn^{+4}$ and $Mn^{+3}$ reduction, and $Cr^{+6}$ is desorbed into solution. The oxidation reaction does not occur with soluble manganese ($Mn^{+2}$). Manganese oxidation of $Cr^{+3}$ is inhibited, however, at pH values greater than 4. Inhibition is due to precipitation of chromium oxide minerals on the surfaces of manganese oxide minerals, which forms a redox-stable sink for soluble $Cr^{+3}$ and a physical barrier between aqueous $Cr^{+3}$ and the manganese surface. Oxidation of $Cr^{+3}$ by dissolved oxygen is very slow under mildly acidic conditions.

The remediation method of the invention involves characterizing the impacted site with respect to the chemical nature of the contaminants, their distribution, and the hydrogeologic features of the site. One or more monitoring wells are bored in the site for the purpose of extracting samples of soil and groundwater. Hydrogeologic characterization will involve a determination of groundwater yield and formation pressure or total stress. The concept of yield is well known in the art and may be applied on several scales. If the unit of study is a single well, then a well yield may be defined. If the unit of study is an aquifer, then an aquifer yield may be defined. As determined for the purposes of the present invention, a sustainable yield is the maximum pumping rate that can be supplied by a unit of study without lowering the groundwater level below a pump intake.

Substances which have been discharged to the soil and groundwater are chemically characterized by a variety of analytical methods, all of which are known in the art. Commonly used methods for determination of chromium, heavy metals and semi-metals are described in United States Environmental Protection Agency (USEPA) SW-846. Methods for sample preparation and determination of hexavalent chromium in soil and water are USEPA SW-846 methods 3060A, 7196A, 7195, and 7191. Once the contaminants have been defined, a three-dimensional study is conducted as described in U.S. Pat. No. 5,525,008 heretofore referenced, to determine the volumetric quantities of the impacted area, and its hydrogeological characteristics. Additionally, ambient levels of chromium, heavy metals and semi-metals concentrations will be determined.

Utilizing the volumetric quantities of the contaminated area and the composition and concentration(s) of the contaminants, an absolute quantity of contamination is determined. A stoichiometric equation is balanced and the theoretical quantities of reagents are determined for effective treatment of the contaminants. The stoichiometric of the reduction of $Cr^{+6}$ by $Fe^{+2}$ indicates that a molar ratio of $Fe^{+2}:Cr^6$ of 3:1 is an effective amount. It is preferred that a ratio in excess of 3:1, be used to allow for natural inefficiencies under field conditions. Preferably an effective amount of the total ferrous ion to be injected corresponds to a molar ratio of $Fe^{+2}:Cr^{+6}$ in the range from about 4:1 to about 10:1. Most preferably, this ratio will be in the range from about 5:1 to about 7:1. Normally the $Cr^{+6}$ concentrations are monitored and the ferrous ion concentrations increased or decreased as needed to reduce the $Cr^{+6}$.

These $Fe^{+2}:Cr^{+6}$ ratios in the preferred case correspond to between about 133% and about 333% of the theoretical stoichiometric amounts, and in the most preferred case to between about 167% and about 233% of the theoretical stoichiometric amounts. Similar ratios are applied in remediation of other heavy metal and semi-metal contaminants.

A first reactive solution will comprise ferrous sulfate and an acid selected from the group consisting of sulfuric acid and phosphoric acid. A second reactive solution will comprise hydrogen peroxide and an acid selected from the group consisting of sulfuric acid and phosphoric acid.

The ferrous ion and hydrogen peroxide must not mix together until they are in the ground. They are injected as separate solutions. Otherwise the iron will be prematurely oxidized and precipitated rather than distributed through the formation.

The concentration of ferrous sulfate (measured as $FeSO_4$) in the first reactive solution will be from about 100 mg/L to about 6000 mg/L.

Preferably the pH of both the first reactive solution and second reaction solutions is about ph of the first solution is preferably about 3 to 5. The ph of the second solution is about 3 to 7, most preferably 5 to 7. Most preferably the pH of the first reactive solution is in a range from about 3 to about 5.

The hydrogen peroxide concentration in the second reactive solution is preferably less than about 20% and more preferably less than about 10%. Even more a preferably, the hydrogen peroxide concentration in the second reactive solution is repetitively pulsed. This aids mechanical circulation due to pulsating gas evolution. The hydrogen peroxide concentration is pulsed by controlling its rate of flow to the mixing head. The magnitude of the pulsation is preferably at least 10% of the maximum rate of flow and may be as high as 100% (on-off pulsation).

Figure 4:
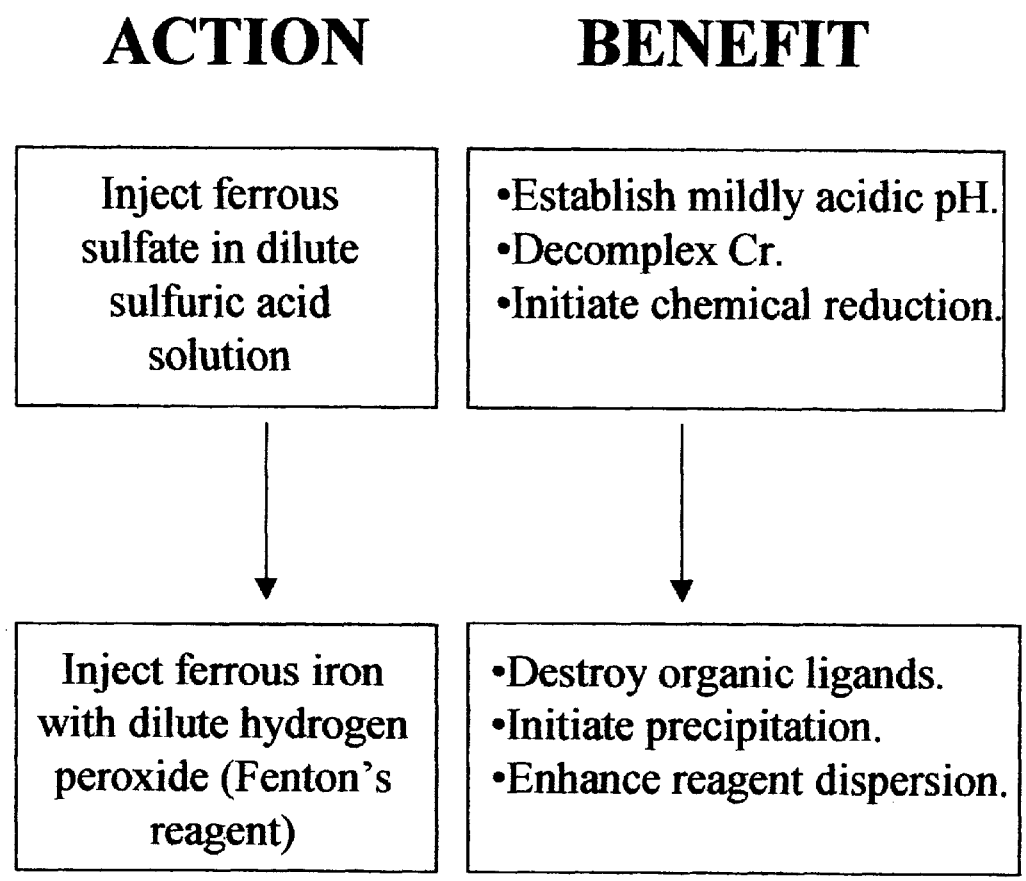
FIG. 4 illustrates the chemical steps of the invention.

The remediation approach comprises two consecutive reactive steps (FIG. 4): Injection of the first reactive solution comprising $Fe^{+2}$ as ferrous sulfate with dilute sulfuric or phosphoric acid at pH of from about 3 to about 5. This optimizes groundwater pH conditions, provides competitive sulfate or phosphate anions to displace $Cr^{+6}$ from mineral surfaces, initiates chemical reduction of $Cr^{+6}$ to $Cr^{+3}$, and precipitates $Cr^{+3}$ as insoluble $Cr(OH)_3$ or coprecipitated with insoluble iron oxides or iron oxyhydroxides.

Following the first reactive solution, is injection of a second reactive solution comprising with sulfuric and/or phosphoric acid, and dilute hydrogen peroxide (Fenton's reagent) at a pH of about 3 to about 7. This reagent destroys organic Cr complexes, enhances reagent dispersion via gases produced by Fenton's reagent, and precipitates insoluble iron oxyhydroxides, thus enhancing coprecipitation of $Cr^{+3}$.

One starts with the first reactive solution, then follows with the second reactive solution. Then the solutions can be pulsed and individually added.

The ferrous sulfate may be in the form of ferrous sulfate heptahydrate [$FeSO_4.7H_2O$] or other soluble ferrous ion compounds, such as ferrous chloride. Both the first and second reactive solutions may contain other useful consitutents such as surface active agents which act to increase wetting and permeation rate through the soil and enhance distribution of the reactive compounds. The second reactive solution may also contain catalysts to accelerate the decomposition of the hydrogen peroxide or stabilizers to prevent the decomposition from proceeding too rapidly. None of the injected reagents are priority pollutants nor pose an environmental hazard.

The injection methodology of the present invention has been described in U.S. Pat. No. 5,525,008 heretofore incorporated by reference. Reagents are injected under pressure via specially designed injectors to generate a wide radius of influence for reagent dispersion. The hydrogen peroxide is introduced to the second solution at a mixing head immediately before injection into the ground to prevent premature decomposition. The injection pressure is sufficient to overcome the hydrostatic head, and is typically 5 to 40 pounds per square inch [psi] depending upon site conditions. Higher pressures are associated with deeper injection depths and less permeable matrices.

In one embodiment of this invention, the injection pressure is pulsated. It is well known in the chemical engineering arts that mass transfer in pulsed columns is enhanced (Perry's Chemical Engineers Handbook. Sixth Edition, p.21–80 to 21–82, McGraw, N.Y. 1984). This technique appears not to have been previously utilized for in-situ remediation. The magnitude of the pressure pulsations is at least 5% of the formation pressure in the underground area and the frequency of the pulsations is at least equal to one-fourth the reciprocal of the decay time of a pressure pulse. Preferably, the magnitude of the pressure pulsations is at least 25% of the formation pressure in the underground area and the frequency of the pulsations is at least equal to the reciprocal of the decay time of a pressure pulse.

Treatment is completed when the effective amounts of the first and second solutions have been injected into the soil. Alternatively, treatment may be terminated when monitoring wells show that contaminant levels have been reduced to ambient.

The key innovative chemical steps in the method of the invention are the sequential injections of reagents to first desorb hexavalent chromium from mineral surfaces, and then to destroy organic complexes and enhance reagent dispersion and precipitation. A mixture of ferrous iron and hydrogen peroxide (Fenton's reagent) generates a hydroxyl free radical ($OH^·$). The $OH^·$ destroys organic ligands and thus decomplexes Cr from soluble organic complexes, generates oxygen and carbon dioxide gases to enhance reagent distribution through the aquifer, and precipitates iron along with chromium in a mineral form. Under acidic conditions, hydrogen: peroxide will also reduce hexavalent chromium to trivalent chromium. $Fe^{+2}$ acts as a true catalyst in Fenton's reagent and may be regenerated by subsequent reactions with $OH^·$ that are generated. Fenton's reagent injection is not the focus of the treatment process, and injected hydrogen peroxide concentrations and volumes are considerably lower than those typically utilized for in-situ chemical oxidation of organic compounds. Following the injection process, unconsumed hydrogen peroxide naturally decomposes to water and oxygen, groundwater pH returns to ambient conditions, and excess $Fe^{+2}$ oxidizes to $Fe^{+3}$ and rapidly precipitates.

General experience has been that the sites with the greatest hexavalent chromium impact to groundwater have been those with sandy aquifers and low total content of organic matter. Sites with these characteristics are anticipated to be ideally suited to the application of the current invention.

Having described the present invention in detail, it will be understood that various changes and modifications may suggest themselves to one skilled in the art, all falling within the scope of the present invention as defined by the following claims.

What is claimed is:

1. A method for the in-situ treatment and remediation of an underground area contaminated with at least one member selected from the group consisting of hexavalent chromium and other heavy metals, semi-metals and cyanide comprising the steps of:

(a) determining an effective amount and concentration of a first reactive solution comprising ferrous sulfate and an acid selected from the group consisting of sulfuric acid and phosphoric acid required to decomplex chromium and other heavy metals, semi-metals and cyanide from mineral surfaces, initiate reduction of hexavalent chromium to trivalent chromium and reduction of heavy metals and semi-metals to their least soluble valence state and to precipitate trivalent chromium, heavy metals and semi-metals as insoluble compounds;

(b) determining an effective amount and concentration of a second reactive solution comprising hydrogen peroxide and an acid selected from the group consisting of sulfuric acid and phosphoric acid to have a pH of about 3 to about 7 required to destroy organic ligands and enhance decomplexation;

(c) injecting the first reactive solution and subsequently the second reactive solution at an effective pressure and at a flow rate in excess of a sustainable yield, the amount of said first reactive solution and second reactive solution into one or more injectors that are inserted into the ground, sealed and positioned so as to assure liquid flow and dispersion of the reactive solutions through the contaminated area; and (d) allowing said first and second reactive solutions to flow through the contaminated area thereby reacting chemically with the contaminants contained therein, and converting said contaminants into environmentally inert substances without producing collateral contamination.

2. A method as recited by claim 1, wherein during the flow of the second reactive solution, the hydrogen peroxide concentration is repetitively pulsed.

3. A method as recited by claim 1, wherein the underground area is contaminated with hexavalent chromium.

4. A method as recited by claim 1, wherein the underground area is contaminated with hexavalent chromium and it is precipitated as insoluble compounds of trivalent chromium.

5. A method as recited by claim 1, wherein the pH of the first reactive solution is between about 3 and about 5 and the pH of the second reactive solution is also between about 5 and about 7.

6. A method as recited by claim 5, wherein the pH of the first reactive solution is between about 4 and about 5.

7. A method as recited by claim 1, wherein the contaminant is hexavalent chromium and the effective amount of ferrous ion in proportion to the amount of said contaminant is between about 133% and 333% of the theoretical stoichiometric amount.

8. A method as recited by claim 7, wherein the effective amount of ferrous ion in proportion to the amount of contaminant is between about 167% and 233% of the theoretical stoichiometric amount.

9. A method as recited by claim 1, wherein the concentration of ferrous ion in the first reactive solution is between 100 mg/L and about 6000 mg/L.

10. A method as recited by claim 1 wherein the contaminant is a non-chromium constituent and wherein the iron concentration of the first reactive solution is between 50 and 1000 mg/L and the peroxide concentration in the second solution is 1–25 wt/%.

11. A method for the in-situ treatment and remediation of an underground area contaminated with at least one member selected from the group consisting of hexavalent chromium and other heavy metals, semi-metals and cyanide comprising the steps of:

(a) determining an effective amount and concentration of a first reactive solution comprising ferrous sulfate and an acid selected from the group consisting of sulfuric acid and phosphoric acid required to decomplex chromium and other heavy metals, semi-metals and cyanide from mineral surfaces, initiate reduction of hexavalent chromium to trivalent chromium and reduction of heavy metals and semi-metals to their lowest soluble valence state and to precipitate trivalent chromium, heavy metals and semi-metals as insoluble compounds;

(b) determining an effective amount and concentration of a second reactive solution comprising hydrogen peroxide and an acid selected from the group consisting of sulfuric acid and phosphoric acid to have a pH of about 3 to about 7 required to destroy organic ligands and enhance decomplexation;

(c) injecting the first reactive solution and subsequently the second reactive solution at a flow rate in excess of a sustainable yield and with a pulsating pressure, the amount of said first reactive solution and second reactive solution into one or more injectors that are inserted into the ground, sealed and positioned so as to assure liquid flow and dispersion of the reactive solutions through the contaminated area; and (d) allowing said first and second reactive solutions to flow through the contaminated area thereby reacting chemically with the contaminants contained therein, and converting said contaminants into environmentally inert substances without producing collateral contamination.

12. A method as recited by claim 11, where the magnitude of the pressure pulsations is at least 5% of the formation pressure in the underground area and the frequency of the pulsations is at least equal to one-fourth the reciprocal of the decay time of a pressure pulse.

13. A method as recited by claim 11, wherein the underground area is contaminated with hexavalent chromium.

14. A method as recited by claim 11, wherein the underground area is contaminated with hexavalent chromium and it is precipitated as insoluble compounds of trivalent chromium.

15. A method as recited by claim 11, wherein the pH of the first reactive solution is between about 3 and about 5 and the pH of the second reactive solution is between about 5 and about 7.

16. A method as recited by claim 11, wherein the contaminant is hexavalent chromium and wherein the effective amount of ferrous ion in proportion to the amount of contaminant is between about 133% and 333% of the theoretical stoichiometric amount.

17. A method as recited by claim 16, wherein the effective amount of ferrous ion in proportion to the amount of contaminant is between about 167% and 233% of the theoretical stoichiometric amount.

18. A method as recited by claim 11, wherein the concentration of ferrous ion in the first reactive solution is between 100 mg/L and about 6000 mg/L.

* * * * *

UNITED STATES PATENT AND TRADEMARK OFFICE
CERTIFICATE OF CORRECTION

PATENT NO.      : 6,623,646 B2
DATED           : September 23, 2003
INVENTOR(S)     : James Daniel Bryant et al.

It is certified that error appears in the above-identified patent and that said Letters Patent is hereby corrected as shown below:

<u>Title page,</u>
Item [73], add:
-- [73] Geo-Cleanse International Inc., Kenilworth, NJ --

Signed and Sealed this

Twenty-fifth Day of November, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,623,646 B2  Page 1 of 1
DATED : September 23, 2003
INVENTOR(S) : James Daniel Bryant et al.

It is certified that error appears in the above-identified patent and that said Letters Patent is hereby corrected as shown below:

<u>Title page,</u>
Item [73], delete "James Daniel Bryant, Howell, NJ(US)" and add:
-- [73] Geo-Cleanse International Inc., Kenilworth, NJ --

This certificate supersedes Certificate of Correction issued November 25, 2003.

Signed and Sealed this

Seventeenth Day of February, 2004

JON W. DUDAS
*Acting Director of the United States Patent and Trademark Office*